May 16, 1939. W. K. RANKIN Re. 21,087

VACUUM SWITCH

Original Filed Feb. 23, 1934 2 Sheets-Sheet 1

Inventor:
William K. Rankin,
by Harry E. Dunham
His Attorney

May 16, 1939. W. K. RANKIN Re. 21,087

VACUUM SWITCH

Original Filed Feb. 23, 1934 2 Sheets-Sheet 2

Inventor:
William K. Rankin,
by Harry E. Dunkum
His Attorney.

Reissued May 16, 1939

Re. 21,087

UNITED STATES PATENT OFFICE 21,087

VACUUM SWITCH

William K. Rankin, Lansdowne, Pa., assignor to General Electric Company, a corporation of New York Original No. 2,090,519, dated August 17, 1937, Serial No. 712,521, February 23, 1934. Application for reissue March 28, 1939, Serial No. 264,597

23 Claims. (Cl. 200—106)

Figure 1:
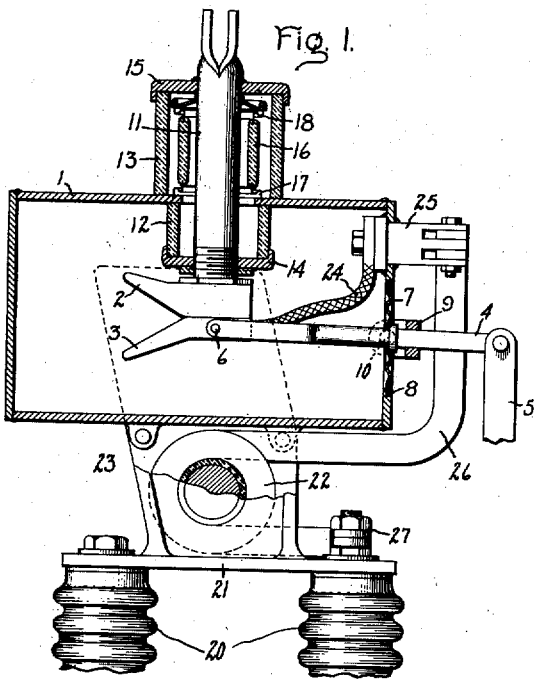

My invention relates to vacuum circuit interrupters, more particularly to high vacuum switches for interrupting high tension power circuits, and has for its principal object the provision of an improved vacuum switch of the aforesaid type which shall have greatly increased interrupting capacity and which shall be simple and compact in construction and efficient and reliable in operation.

High vacuum circuit breakers capable of consistent interruptions of R. M. S. currents up to 5,000 amperes at 12 to 15 kv. have heretofore been constructed. The operation beyond this point was unpredictable and fortuitous. The real limitations on the interrupting capacity of this type of circuit breaker, however, were not recognized prior to the present invention.

I have found that successful operation of a high vacuum circuit interrupter depends on the amount and pressure of metallic vapor surrounding the coacting electrode or contact surfaces of the interrupter when the zero point of the alternate current wave is reached. Assuming that the contacts are composed of copper, the amount of copper vapor generated depends on the R. M. S. amperes at the cathode spot and the rapidity of motion of the cathode spot over the contact surface, the maximum generation of copper vapor occurring when the cathode spot is stationary. The theory involving the formation and maintenance of the cathode spot need not be considered in detail for an understanding of the present invention, it being sufficient to point out that upon separation of the contacts there is localized heating and emission of electrons at one of the contacts, depending upon the polarity thereof at the time of contact separation, said localized condition or cathode spot existing on that contact until the zero value of the alternating current wave is reached after which it reestablishes on the other contact under favorable conditions. The cathode spot serves to support and maintain flow of current between the contacts by reason of emission of electrons and ionization of metallic vapor and gas formed by heating, the emission serving to ionize by collision the metallic vapor and gas adjacent the contacts, which results in bombardment of the cathode spot, further heating thereof, and consequent generation of more metallic vapor. The presence of metallic vapor, therefore, aids the flow of current by reason of the ionization thereof. On the other hand the absence of metallic vapor around the contact surfaces at the current zero greatly reduces the possibility of re-formation of the cathode spot. Under such conditions high tension power circuits of large amperage may be interrupted in one-half cycle.

The dissipation of this metallic vapor can be effected only through condensation thereof on the surrounding walls. The condensation however is limited by the fact that the first few molecular layers do not instantly dissipate their heat to the walls and the following metallic molecules are consequently reflected.

I have furthermore found that the generation of metallic vapor may be substantially eliminated and the interrupting capacity of the high vacuum switch increased many times by moving the cathode spot at high velocity over the contact surfaces and that this movement of the cathode spot and associated electron stream may be effected by means of a magnetic field.

The use of a magnetic field in both air and fluid-break or oil circuit breakers for the purpose of facilitating interruption of the arc is well known practice. Such use of a magnetic field is based on the fact that the resistance of the arc may be increased by mechanically stretching and reducing the cross sectional area of the same through a dielectric or insulating material or by forcibly moving the arc into intimate engagement with a surrounding insulating medium. By so breaking up and increasing the resistance of the arc within an insulating fluid as air or oil, interruption of the arc is greatly facilitated.

However in the case of vacuum switches the use of a magnetic field has heretofore been considered without value, particularly in view of the characteristic rapid wandering action of the cathode spot in vacuum devices. In other words, the cathode spot, which serves to support and maintain flow of current between the electrodes or contacts of a vacuum switch, inherently travels over the contact surfaces at random and at varying speed, no special provision being made to obtain this action. Furthermore the method of breaking up and increasing the resistance of the arc, which in the case of a vacuum switch is in the nature of an electron discharge, by means of an insulating fluid in the manner above described is of course eliminated.

Notwithstanding the peculiar characteristics of the vacuum switch which would indicate the use of a magnetic field to be without value in interrupting a high tension power circuit, I have found that a magnetic field may be utilized adjacent vacuum switch contacts so as not only to improve the interrupting characteristics of the switch but also greatly to increase the interrupting capacity thereof.

In accordance with my invention the electron stream in the gap between the coacting contact or electrode surfaces is subjected to a magnetic field so as definitely and rapidly to move said stream and the cathode spot about said contact or electrode surfaces at such a rate that substantially no metallic vapor is formed in said gap. More particularly the cathode spot is rotated at very high speed or spun about the contact or electrode surfaces by a radial magnetic field during interruption of the circuit in a preferred form of the invention.

My invention will be more fully set forth in the following description referring to the accompanying drawings, and the features of novelty which characterize my invention will be pointed out with particularity in the claims annexed to and forming a part of this specification.

Figure 2:
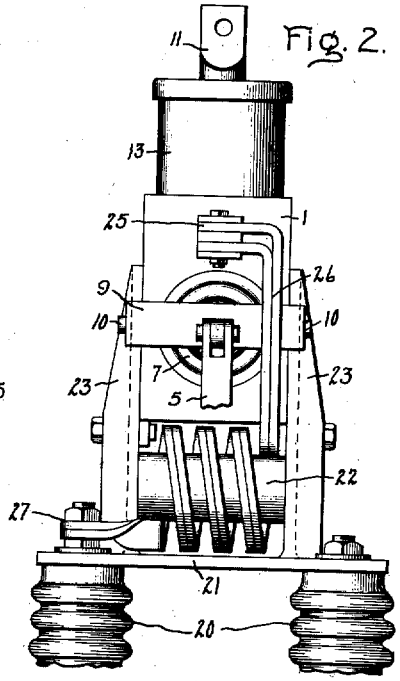
Figure 3:
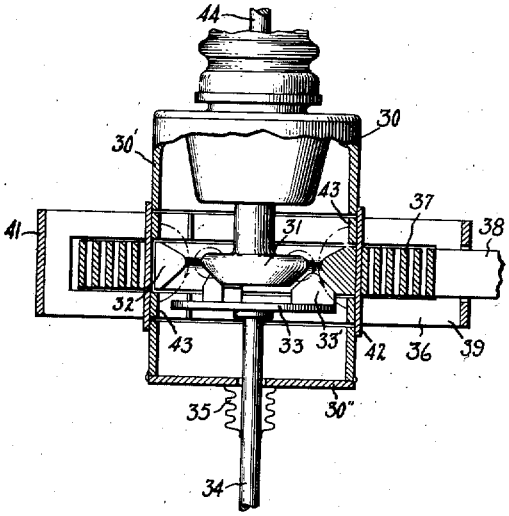
Figure 4:
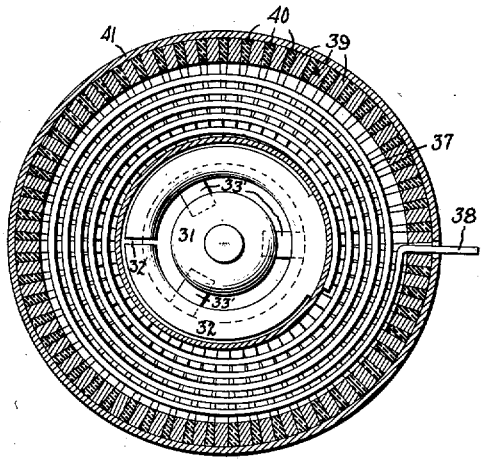
Figure 5:
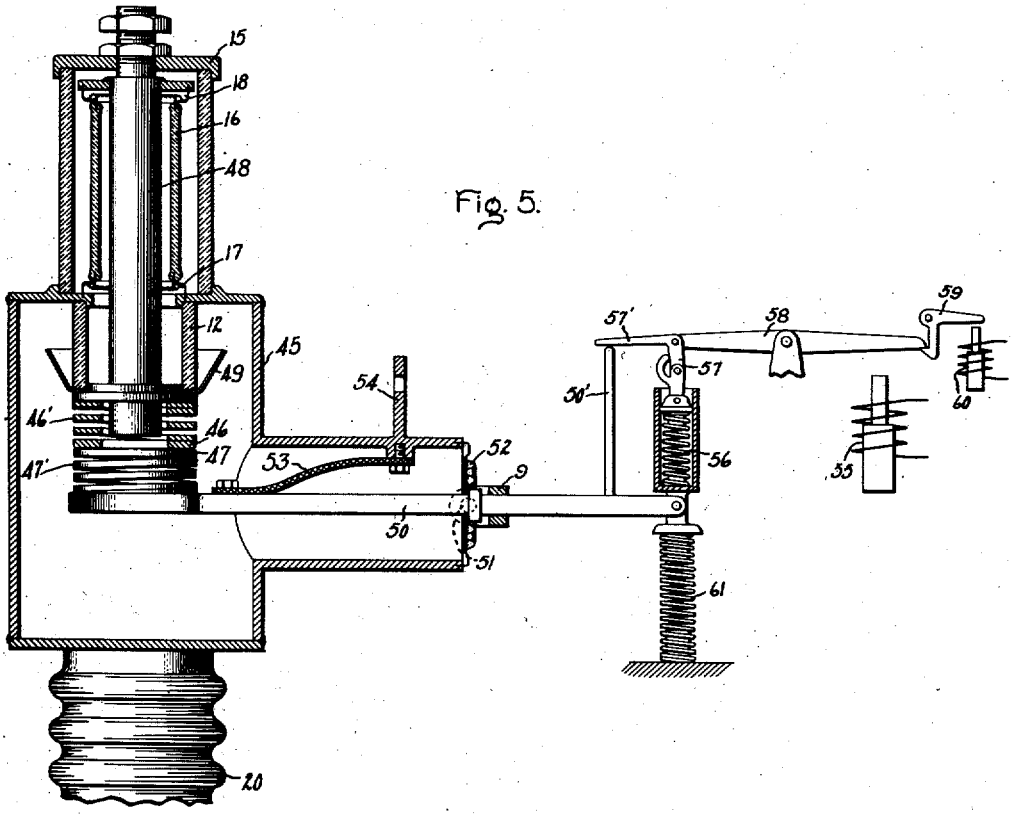

Referring more particularly to the drawings, Fig. 1 is an elevational view, partly in section, of a high vacuum switch embodying the present invention for interrupting high tension power circuits; Fig. 2 is an elevational end view of the vacuum switch shown in Fig. 1; Fig. 3 is an elevational view, partly in section, of another form of high vacuum switch embodying the present invention; Fig. 4 is a plan sectional view of the vacuum switch shown in Fig. 3; Fig. 5 is an elevational view, partly in section of another form of vacuum switch together with operating mechanism therefor embodying the present invention; and Fig. 5a indicates the magnetic field between the contacts of Fig. 5 upon separation thereof.

The vacuum switch illustrated by Figs. 1 and 2 comprises a highly evacuated casing 1 in which are disposed coacting relatively movable switch contacts 2 and 3. The operating means for the switch contacts comprises in the present instance a pivoted arm 4 connected as at 5 to suitable motive means and as at 6 within the evacuated casing to contact 3. The operating arm 4 extends through and is sealed to a flexible metallic diaphragm 7 which is in turn sealed as at 8 to the casing 1 so as to form a wall portion thereof. The pivotal mounting for the arm 4 comprises a yoke member 9 which is connected to the arm 4 and pivotally mounted at 10 on the exterior of the casing. The pivot 10 is located so that its center line is substantially in the plane of the diaphragm 7 as indicated in Fig. 1 so as to minimize flexing of the diaphragm upon pivotal movement of the operating arm 4.

The stationary contact 2 coacting with the movable contact 3 is connected to and mounted on the lower end of a conductor stud 11 which is mounted in and insulated with respect to a wall of the casing 1 in any suitable manner. In the present instance the conductor stud 11 is insulated from the casing 1 by a pair of insulating collars or sleeves 12 and 13 coacting with flanges 14 and 15 respectively which are secured at opposite ends of the conductor stud. The sealing means for the conductor stud comprises an insulating sleeve 16 which is sealed by means of flexible metallic diaphragms 17 and 18 to the casing and the conductor stud respectively. The insulating mounting and sealing means for the conductor stud 11 form no part of the present invention and are described with more particularity and claimed in applicant's Patent No. 1,905,751 granted April 25, 1933, for Vacuum sealing structure.

The casing 1 and the diaphragm 7 as illustrated are composed of a suitable metal for keeping high vacua, the metal comprising at least the side walls of the casing being non-magnetic. The contacts 2 and 3 preferably are composed of a low-resistance material as copper which may be readily freed of occluded gases. The switch is mounted on an insulating support comprising insulators 20 on which supporting structure 21 for the switch casing is mounted.

For the purpose of utilizing a magnetic field adjacent the switch contacts 2 and 3 in the manner previously described, an electromagnet 22 connected in series with the circuit to be interrupted is provided with pole pieces 23 located at opposite sides of the casing 1 so that the contacts 2 and 3 are disposed between the same as illustrated. The circuit through the switch therefore comprises the terminal and conductor stud 11, contacts 2 and 3, flexible conductor 24 interconnecting the contact 3 and terminal 25 sealed through a wall of casing 1, conductor 26, electromagnet 22 and terminal 27. The wall portions of the casing 1 opposite the poles of the electromagnet may be composed of a high-resistance, non-magnetic metal so that circulating currents in the casing are substantially limited.

Therefore upon separation of the switch contacts in response to counter-clockwise rotation of the operating arm 4 the electron discharge between the contacts for sustaining current flow is subjected to a strong magnetic field transversely thereof which causes shifting of the electron stream and the cathode spot over the coacting contact surfaces and towards the outer tips of the contacts at a high rate of speed. The shifting of the electron discharge and the cathode spot takes place at very high speeds as in vacuum tubes so that there will be little, if any, metallic vapor boiled from the contacts during the circuit interrupting operation. The operation of the vacuum switch is very fast, the current generally ceasing within one-half cycle of alternating current at commercial frequencies. Furthermore, destructive burning of the contacts is eliminated and an extreme degree of degassing is rendered unnecessary due to the fact that there is no deep burning of the contacts.

A detailed description of the method of constructing the vacuum switch is believed to be unnecessary other than to point out that well known methods of degassing the switch structure and obtaining high vacua may be used. All current-carrying parts of the switch structure and likewise parts exposed to heat are suitably degassed and the switch casing is evacuated, preferably to as high degree as can practically be obtained.

Figs. 3 and 4 illustrate a form of my invention wherein electromagnetic means are arranged to induce currents in the contact structure, the magnetic field resulting from the interaction of the main magnetic field and that produced by the aforesaid induced currents being in such a direction in the gap between the contact surfaces upon opening of the circuit that the cathode spot is rapidly rotated or spun about said contact surfaces.

Referring more particularly to the drawings, an evacuated casing 30 has disposed therein relatively movable contact structure comprising a stationary disk-like contact member 31, an annular contact member 32 surrounding and spaced with respect to the contact 31, and a movable bridging contact member 33 for interconnecting the contacts 31 and 32. As best illustrated by Fig. 4, the contact 32 comprises a ring split as at 32', for the purpose of minimizing induced or eddy currents, and the bridging contact member 33 is provided with three contact portions 33' having wedge-shaped contact surfaces corresponding to the coacting contact surfaces of the contacts 31 and 32.

The bridging member 33 is provided with an operating rod 34 extending through the switch casing for connection to suitable motive means and is sealed to the casing by means of a flexible metallic bellows 35. The operation of the bridging member in opening and closing the circuit between the contacts 31 and 32 is believed to be obvious without further description.

The electromagnetic means for producing a field as above described upon opening of the circuit comprises an electromagnet 36 surrounding the contact structure exteriorly of the casing 30. The electromagnet 36 comprises a spirally wound conductor 37, the outer turn extending as at 38 to one of the vacuum switch terminals, and the inner turn electrically connected in a manner presently described to the contact 32. The magnetic circuit of the electromagnet comprises a plurality of U-shaped members 39 composed of suitable magnetic material as iron and arranged radially with respect to the coil 37 and abutting the switch casing 30 as illustrated by Fig. 4. Insulating spacers 40 coacting with a band 41 serve to maintain the magnetic members 39 in position and to strengthen the structure.

For the purpose of minimizing heating of the switch casing and for directing a strong magnetic field adjacent the contact structure, the casing 30 is composed of two sections 30' and 30'' interconnected by a band 42 composed of a suitable non-magnetic high-resistance metal. Or in lieu of this the entire switch casing may be constructed of such material. The contact 32 and the inner turn of the coil 37 are electrically connected to the wall portion 42 at opposite sides thereof, preferably at a low resistance point especially provided for such connection. The legs of the magnetic members 39 abut the outer side of the wall portion 42 as illustrated, the switch casing being provided with slotted magnetic pole pieces 43 at the inner side of the wall portion 42 and opposite the leg portions of the electromagnets. It will therefore be apparent that energization of the electromagnet produces a magnetic field within the switch casing between the coacting pole pieces 43.

During normal operation of the vacuum switch the bridging member 33 is elevated to interconnect contacts 31 and 32 and the circuit through the vacuum switch includes the insulated lead-in conductor 44 which may constitute one terminal of the switch, contacts 31, 33 and 32, the non-magnetic wall portion 42, and magnet coil 37. Upon opening the circuit by lowering of the bridging member 33, the annular gap between the contact surfaces of contacts 31 and 32 is traversed by a magnetic field generally as indicated by Fig. 3. The induced currents set up in the contact member 31 by the main magnetic field of the electromagnet 36 in turn produce a field in opposition to the magnetic field so that the resulting field traverses the annular gap throughout in a definite direction so as to cause rapid rotation of the electron stream and cathode spot about the contact surfaces. This rotation of the cathode spot, as previously pointed out, is extremely rapid and increases the interrupting capacity of the vacuum switch many times. As in the previous instance the circuit is generally interrupted within one-half cycle and there is no noticeable burning of the contacts.

Fig. 5 illustrates another form of my invention wherein a radial field traversing an annular gap between the contacts is produced by electromagnets whose fields oppose each other. More particularly the vacuum switch comprises a casing 45 within which relatively movable annular contacts 46 and 47 are disposed. Each of the contacts is electrically connected to a helical conductor as indicated at 46' and 47', respectively, the coils formed by said conductors being wound in opposite directions so that the magnetic fields of the respective coils are in opposition to each other. The upper contact 46 and associated coil 46' are connected to and supported at the lower end of an insulated lead-in conductor stud 48 forming one terminal of the switch. The lead-in conductor stud 48 is mounted and sealed with respect to the casing 45 generally in the manner described with reference to Fig. 1. At the lower end of the conductor stud a shield 49, generally conical in form, is provided for the purpose of preventing short circuiting of the insulating collar 12 by a deposition of metallic particles.

The movable contact 47 and coil 47' are carried by an operating arm 50 pivotally mounted as at 51 exteriorly of the casing and sealed to the casing by a flexible metallic diaphragm 52 as in Fig. 1. The movable contact structure above described is electrically connected as by a flexible conductor 53 to the metallic casing 45 which has formed thereon the other terminal 54.

Figure 5A:
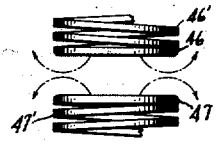

Upon opening of the switch contacts 46 and 47 by counter-clockwise rotation of the operating arm 50 the opposing fields produced by the coils 46' and 47' produce a strong radial field transversely of the annular gap between the contacts as illustrated by Fig. 5*a* so that the electron stream and cathode spot are rotated about the contact surfaces at great speed as in Fig. 3. The coils 46' and 47', which are connected in series with the contacts 46 and 47, and the circuit to be interrupted therefore produce a powerful magnetic field which functions positively to shift the cathode spot at very high speed causing very efficient and prompt interruption of the circuit.

In view of the fact that the fields of the coils 46' and 47' are in opposition it will be apparent that the contacts 46 and 47 are normally biased away from each other, the repelling force depending on the current traversing the switch. When the operating arm 50 is maintained in closed circuit position, the resilience of the coils 46' and 47', which are under compression in the closed circuit position, maintains the contacts in proper engagement.

For the purpose of utilizing the aforesaid repellant force so as to cause opening of the switch upon occurrence of a predetermined overload or short circuit, operating and tripping mechanism is provided responsive to such overload or short circuit conditions. To this end the operating arm 50 is operatively connected to the actuating solenoid 55 through resilient means, as a compression spring 56, a thrust-transmitting and tripping toggle 57 related to the switch arm 50, and a centrally pivoted lever 58. In the closed circuit position shown the switch arm 50 is maintained in position by the bias of spring 56 which is in turn held in compressed position by the overset toggle 57 and latch 59 acting at the opposite end of the lever 58. The switch may be tripped through the latch 59 by means of a tripping solenoid 60 actuated either by push button control or in response to any abnormal circuit condition. The tripping in response to predetermined overload is however regulated by the tension of spring 56 which may be adjusted in any suitable manner. When the repellant force at the switch contacts is sufficient to move the switch arm 50 slightly counter-clockwise against the bias of spring 56 the extension 50' of the switch arm engages the extension 57' of one link of the overset toggle 57 so as to cause buckling of the toggle and opening of the switch by spring 61. The spring 56 obviously is stronger than spring 61, the latter spring being merely for the purpose of assisting in the switch opening operation. In the circuit closing operation, the actuating solenoid 55 causes counter-clockwise rotation of the lever 58 so as to close the switch through the thrust-transmitting toggle 57 and spring 56. The latch 57 is reset in its thrust-transmitting position by release of the latch 59 which causes clockwise rotation of lever 58. The above described mechanism is trip-free in operation, that is the switch cannot be held closed while an abnormal condition obtains in the circuit.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. A vacuum switch for interrupting high tension power circuits, comprising a highly evacuated casing, relatively movable contacts substantially freed of occluded gases disposed within said casing, operating means for said contacts, and means for producing a magnetic field adjacent the arc path formed by separation of said contacts for rapidly shifting the cathode spot on said contacts at such a rate that substantially no metallic vapor is formed in said casing.

2. A vacuum switch for interrupting high tension power circuits, comprising a highly evacuated casing, relatively movable contacts substantially freed of occluded gases disposed within said casing, operating means for said contacts, and means for producing a magnetic field adjacent the arc path formed by separation of said contacts for rapidly and continually shifting the cathode spot over the contact surfaces of said contacts at such a rate that substantially no metallic vapor is formed in said casing.

3. A vacuum switch for interrupting high tension power circuits, comprising a highly evacuated casing, relatively movable contacts substantially freed of occluded gases disposed within said casing, operating means for said contacts, and means for producing a magnetic field between said contacts upon separation thereof for rapidly rotating the electron stream and cathode spot with respect to the surfaces of said contacts at such a rate that substantially no metallic vapor is formed in said casing.

4. A vacuum switch for interrupting high tension power circuits, comprising a highly evacuated casing, relatively movable contacts disposed within said casing, operating means for said contacts, and means for producing opposing magnetic fields between said contacts upon separation thereof for causing rapid rotation of the electron stream and cathode spot with respect to the contact surfaces at such a rate that substantially no metallic vapor is formed in said casing.

5. A vacuum switch for interrupting high tension power circuits, comprising a highly evacuated casing, relatively movable contacts arranged to form an annular gap between the same upon separation thereof, operating means for said contacts, and means for producing a radial magnetic field within said gap so as to cause rapid rotation of the cathode spot over the contact surfaces defining said gap at such a rate that substantially no metallic vapor is formed in said casing.

6. A vacuum switch for interrupting high tension power circuits, comprising a highly evacuated casing, relatively movable contact structure disposed within said casing comprising a centrally-positioned contact member, a ring-like contact member forming with said first-named member an annular gap, and a bridging member for interconnecting said contact members, operating means for effecting relative movement of the bridging member with respect to said contact members, and an electro-magnet surrounding said casing for producing a magnetic field in said annular gap upon opening of the circuit so as to cause rapid rotation of the electron stream about said contact members.

7. A vacuum switch for interrupting high tension power circuits, comprising a highly evacuated metallic casing, said casing having a wall portion composed of a non-magnetic high resistance metal, relatively movable contact structure disposed within said casing arranged to form an annular gap upon opening of the circuit, said contact structure electrically connected to said wall portion within said casing, operating means for said contact structure, and an electromagnet exteriorly of said casing and adjacent said wall portion for producing a magnetic field between the coacting contact surfaces of said contact structure, said electromagnet electrically connected to said wall portion exteriorly of said casing.

8. A vacuum switch for interrupting high tension power circuits, comprising a highly evacuated casing, relatively movable contacts disposed within said casing, said contacts electrically connected to helical conductors arranged so that the magnetic field produced thereby during normal operation of the switch tends to bias said contacts apart, operating means for said contacts including a contact operating member, resilient means opposing said magnetic bias, and tripping means interconnecting said member and said resilient means arranged to release said resilient means and permit opening of the switch contacts when said magnetic bias exceeds a predetermined magnitude.

9. The combination with an electric switch having contacts normally biased towards open circuit position by the magnetic forces of the circuit to be interrupted, of operating and tripping means for said switch comprising a spring for maintaining said contacts closed against said magnetic bias, and tripping means operatively connected to said contacts for causing release of said spring and opening of said contacts when said magnetic bias exceeds a predetermined magnitude.

10. The combination with an electric switch comprising relatively movable contacts normally biased towards open circuit position by the magnetic forces of the circuit to be interrupted, of operating means for said contacts comprising an actuating member, a spring connected to said member for maintaining said contacts in engagement against the bias of said magnetic forces, motive means, means operatively interconnecting said motive means and said spring including a tripping toggle, separate tripping means operatively connected to said interconnecting means, and a spring connected to said actuating member for biasing said contacts towards open circuit position, said tripping toggle and actuating member being operatively connected so that said first-named spring is released when the magnetic bias on said contacts exceeds a predetermined magnitude thereby causing separation of said contacts.

11. A vacuum switch for interrupting high tension power circuits comprising an evacuated casing, relatively movable contacts disposed within said casing, electromagnetic means connected in series with said contacts arranged to induce currents in one of said contacts upon opening of the circuit, the resulting magnetic field adjacent said contacts causing rapid rotation of the cathode spot on said contacts at such a rate that substantially no metallic vapor is formed in said casing, and operating means for effecting relative movement of said contacts.

12. A vacuum switch for interrupting high tension power circuits comprising an evacuated casing, relatively movable contacts disposed within said casing arranged to form a substantially annular gap upon separation thereof, electromagnetic means arranged to induce currents in one of said contacts upon opening of the circuit, the resulting magnetic field within said annular gap causing rapid and definite rotation of the cathode spot on the coacting contact surfaces at such a rate that substantially no metallic vapor is formed in said casing, and operating means for effecting relative movement of said contacts.

13. A vacuum switch for interrupting high tension power circuits comprising an evacuated casing, relatively movable contact structure disposed within said casing, electromagnetic means connected in series with said contact structure for producing a magnetic field in the gap between the coacting contact surfaces upon separation thereof, said magnetic field causing rapid and definite movement of the cathode spot on said contact surfaces at such a rate that substantially no metallic vapor is formed in said gap, and operating means for said contact structure.

14. A vacuum circuit interrupter for high tension, alternating current power circuits comprising a highly evacuated casing, coacting electrodes substantially freed of occluded gases disposed within said casing, said electrodes being separated by a gap upon opening of the circuit, and means for applying a magnetic field at said gap for rapidly moving the cathode spot formed on said electrodes at such a rate that substantially no metallic vapor is formed in said arc gap.

15. In a device of the class described, the combination of two contacts one of which is movable to engage and disengage the other and is biased for disengaging movement, means additional to the said contacts for normally resisting the bias of the movable contact and for retaining the said contact in engaging position which retaining means is normally dependent for its effectiveness upon the avoidance of a predetermined change in the pressure between the contacts, and means acting directly on one of the contacts independently of the retaining means to effect the said predetermined change in the contact pressure and to thereby cause the retaining means to release the movable contact for automatic disengaging movement.

16. The combination in a circuit breaking device of the class described, of two contacts one of which is movable to engage and disengage the other and is biased for disengaging movement, means additional to the said contacts for normally resisting the bias of the movable contact and for retaining the said contact in engaging position which retaining means is normally dependent for its effectiveness upon the contact pressure, and means acting independently of the retaining means to reduce the contact pressure and to thereby cause the retaining means to release the movable contact for automatic disengaging movement.

17. In an automatic circuit breaker, the combination of two contacts one of which is movable to engage and disengage the other and is biased for disengaging movement, means additional to the said contacts for normally resisting the bias of the movable contact and for retaining the said contact in engaging position which retaining means is normally dependent for its effectiveness upon the avoidance of a predetermined change in the pressure between the contacts, and an electro-responsive means operable upon the attainment of a predetermined abnormal current condition in the circuit and acting directly on one of the contacts independently of the retaining means to effect the said predetermined change in the contact pressure and to thereby cause the retaining means to release the movable contact for automatic disengaging movement.

18. In an automatic circuit breaker, the combination of two contacts one of which is movable to engage and disengage the other and is biased for disengaging movement, means additional to the said contacts for normally resisting the bias of the movable contact and for retaining the said contact in engaging position which retaining means is normally dependent for its effectiveness upon the avoidance of a predetermined change in the pressure between the contacts, and an electromagnet arranged to be actuated upon the attainment of a predetermined abnormal current condition in the circuit and upon being so actuated serving independently of the retaining means to effect the said predetermined change in the contact pressure and to thereby cause the retaining means to release the movable contact for automatic disengaging movement.

19. The combination in an automatic circuit breaker, of two contacts one of which is movable to engage and disengage the other and is biased for disengaging movement, means additional to the said contacts for normally resisting the bias of the movable contact and for retaining the said contact in engaging position which retaining means is normally dependent for its effectiveness upon the contact pressure, and an electro-responsive means operable upon the attainment of a predetermined abnormal current condition in the circuit and acting independently of the retaining means to reduce the contact pressure and to thereby cause the retaining means to release the movable contact for automatic disengaging movement.

20. The combination in an automatic circuit breaker, of cooperating movable and substantially stationary cooperating contacts of which the latter is resiliently mounted so as to yield as pressure is applied to effect normal contact engagement, means biasing the movable contact for disengaging movement, means additional to the said contacts for normally retaining the movable contact in contact engaging position which means is normally dependent for its effectiveness upon contact pressure resulting from the said resilient contact mounting and is released to permit automatic disengaging movement of the movable contact when the contact pressure is sufficiently reduced, and an electro-magnet arranged to be energized upon the attainment of excess current conditions in the circuit and upon being so energized acting independently of the retaining means to tend to relatively move the substantially stationary contact so as to reduce the contact pressure and thereby release the retaining means.

21. A vacuum alternating current arc interrupter comprising a highly evacuated casing, cooperating electrodes substantially freed of occluded gases disposed within said casing, said electrodes when spaced defining a gap which may be bridged by an arc, and means for applying a magnetic field at said gap for rapidly moving the cathode spot formed on said electrodes at such a rate that substantially no metallic vapor is formed in said arc gap.

22. A vacuum device adapted to interrupt high tension alternating current power arcs comprising a highly evacuated casing, cooperating electrodes substantially freed of occluded gases disposed within said casing, said electrodes when spaced forming a gap for an arc within said highly evacuated casing, and means for applying a magnetic field at said gap for rapidly moving the cathode spot formed on said electrodes at such a rate that substantially no metallic vapor is formed in said arc gap.

23. A vacuum device adapted to interrupt high tension alternating current power arcs comprising a highly evacuated casing, a pair of electrodes substantially freed of occluded gases disposed within said casing, said electrodes being connected to opposite terminals of said device and arranged to form a gap for an arc within said highly evacuated casing, and means for applying a magnetic field at said gap for rapidly moving the cathode spot formed on said electrodes at such a rate that substantially no metallic vapor is formed in said arc gap.

WILLIAM K. RANKIN.